United States Patent [19]

Kanao

[11] Patent Number: 5,385,174
[45] Date of Patent: * Jan. 31, 1995

[54] PRESSURE-RESISTANT HELICAL CORRUGATED PIPE

[76] Inventor: Shiro Kanao, No. 9-18, Nanpeidai 4-chome, Takatsuki-shi, Osaka, Japan

[*] Notice: The portion of the term of this patent subsequent to Feb. 8, 2011 has been disclaimed.

[21] Appl. No.: 171,773

[22] Filed: Dec. 22, 1993

Related U.S. Application Data

[63] Continuation of Ser. No. 887,661, May 26, 1992, abandoned, which is a continuation of Ser. No. 454,562, Dec. 21, 1989, abandoned.

[30] Foreign Application Priority Data

Dec. 27, 1988 [JP] Japan .................. 63-333133

[51] Int. Cl.⁶ ........................................ F16L 11/112
[52] U.S. Cl. .................................................. 138/122
[58] Field of Search ............... 138/122, 129, 132, 133, 138/134, 153, 159, 172, 173, 174, 175, 176

[56] References Cited

U.S. PATENT DOCUMENTS

| | | | |
|---|---|---|---|
| 494,972 | 4/1893 | Wiegand | 138/134 |
| 1,819,175 | 8/1931 | James | 138/129 |
| 2,475,591 | 7/1949 | Chernack | 138/133 X |
| 4,196,755 | 4/1980 | Kutnyak et al. | 138/150 |
| 4,487,232 | 12/1984 | Kanao | 138/122 |
| 4,754,781 | 7/1988 | Jande putter | 138/98 |
| 4,860,797 | 8/1989 | Richards et al. | 138/122 |
| 4,862,924 | 9/1989 | Kanao | 138/144 |
| 4,998,563 | 3/1991 | Nagayoshi et al. | 138/122 |
| 5,284,185 | 2/1994 | Kanao | 138/122 |

FOREIGN PATENT DOCUMENTS

| | | | |
|---|---|---|---|
| 2645946 | 10/1976 | Germany | 138/122 |
| 736059 | 8/1955 | United Kingdom | 138/172 |
| 907095 | 10/1962 | United Kingdom | 138/122 |
| 24125 | 9/1984 | United Kingdom | 138/133 |

*Primary Examiner*—Lenard A. Footland
*Assistant Examiner*—John P. Darling
*Attorney, Agent, or Firm*—Sughrue, Mion, Zinn, Macpeak & Seas

[57] ABSTRACT

A pressure-resistant helical corrugated pipe comprises a helical corrugated pipe wall formed by a top portion, opposite side wall portions and a bottom portion; a wide metal belt plate of a thin metal plate disposed at least at the top portion and the opposite side wall portions; and a small width metal belt plate being separate from the wide metal belt plate and disposed at the top portion of the pipe wall in overlapping relation to the wide metal belt plate in the direction of the thickness of the pipe wall. The two metal belt plates are integrally connected together at an overlap portion by a synthetic resin material or a rubber material.

10 Claims, 4 Drawing Sheets

PRESSURE-RESISTANT HELICAL CORRUGATED PIPE

This is a continuation of application Ser. No. 07/887,661 filed May 26, 1992, now abandoned which is a continuation of application Ser. No. 07/454,562 filed Dec. 21, 1989, now abandoned.

BACKGROUND OF THE INVENTION

The present invention relates to a pressure-resistant helical corrugated pipe adapted to be buried in the ground, so that telecommunication cables such as an electric cable and a telephone cable can be installed in such a corrugated pipe for the purpose of protecting such cables. Also, such a corrugated pipe is used as a water main pipe, a sewer pipe, or a liquid transport pipe used in a plant or a factory.

Among such conventional pressure-resistant helical corrugated pipes, the type of corrugated pipes adapted for underground use have been required to be pressure-resistant in order to withstand a great ground pressure. In a conventional underground pressure-resistant pipe as shown in FIGS. 10 and 11 (see, for example, Japanese Laid-Open Utility Model Application No. 141889/86 filed by the Applicant of the present application), a continuous reinforcing belt plate 06 made of a thin metal plate is embedded in a pipe wall 01 and extends over a top portion 02 of the helical corrugation, opposite side wall portions 03 and 04, extending from the top portion 02, and part of a bottom portion 05.

However, in such a helical corrugated pipe, the reinforcing metal belt plate 06, which is embedded in the top portion 02 of the pipe wall 01, the opposite side wall portions 03 and 04 and the bottom portion 05, is a continuous unitary plate, and therefore it is not possible to thicken only the top portion 02 of the pipe wall 01 which most contributes to the pressure-resistant strength to withstand a flattening force. As a result, the whole of the metal belt plate 06 must be thickened. When such a thickened metal belt plate 06 is used, the shaping and processing is not easy, and also it is not easy to impart a helical corrugated shape to the metal belt plate when it is helically wound, and as a result the metal belt plate is liable to deformation due to strain. This results in a problem that it is difficult to manufacture the helical corrugated pipe having a good appearance.

SUMMARY OF THE INVENTION

Therefore, an object of the present invention is to provide a pipe of the type in which a belt plate of a thin metal plate is embedded in the pipe wall over the entire or generally entire periphery thereof (in some cases, such metal belt plate is exposed at the surface of the pipe wall) so as to impart a pressure resistance to the pipe, and despite such construction, the manufacture is easy, and a good appearance of the pipe can be easily achieved, and the amount of the covering resin material to be used can be reduced as compared with the conventional pipe to thereby reduce the overall weight of the pipe, and the pipe is excellent in durability.

According to the present invention, there is provided a pressure-resistant helical corrugated pipe having a helical corrugated pipe wall wherein the helical corrugation of the pipe wall is formed by a top portion, opposite side wall portions extending from the top portion and a bottom portion extending from the side wall portions and disposed close to an axis of the pipe; a wide belt plate of a thin metal plate serving as a constituent element for the pipe wall is disposed at least at the top portion and the opposite side wall portions; another metal belt plate of small width separate from the wide metal belt plate is disposed at the top portion of the pipe wall and disposed in overlapping relation to the metal belt plate in the direction of the thickness of the pipe wall in such a manner that the metal belt plate of small width is either disposed in contact with the wide metal belt plate or is spaced therefrom with a resin material interposed therebetween; the two metal belt plates are integrally connected together at the overlap portion by a synthetic resin material or a rubber material.

When the pipe of this construction is, for example, to be buried in the ground, a groove is dug in the ground at a required depth at the installation site, and the pipe is installed along the groove. When this pipe is used as a protective pipe for a cable, an electric cable or a telephone cable is passed through the pipe using a leading wire, and then the dug soil is applied to the pipe from above to cover it. In the case of such a cable-protective pipe, it is preferred that the pipe is not provided with an inner pipe wall so that it offers a less contact resistance when the cable is installed in the pipe. In the case where the pipe is used as a water main pipe or a sewer pipe, it is preferred that the pipe be provided with the inner pipe wall so that it offers a less resistance to the flow of water.

BRIEF DESCRIPTION OF THE DRAWINGS

FIG. 1 is a partly-broken, front-elevational view of a pipe;

FIG. 2 is a longitudinal cross-sectional view of a main portion of the pipe;

DETAILED DESCRIPTION OF THE PREFERRED EMBODIMENTS

Preferred embodiments of the present invention will now be described with reference to the drawings.

Figure 1:
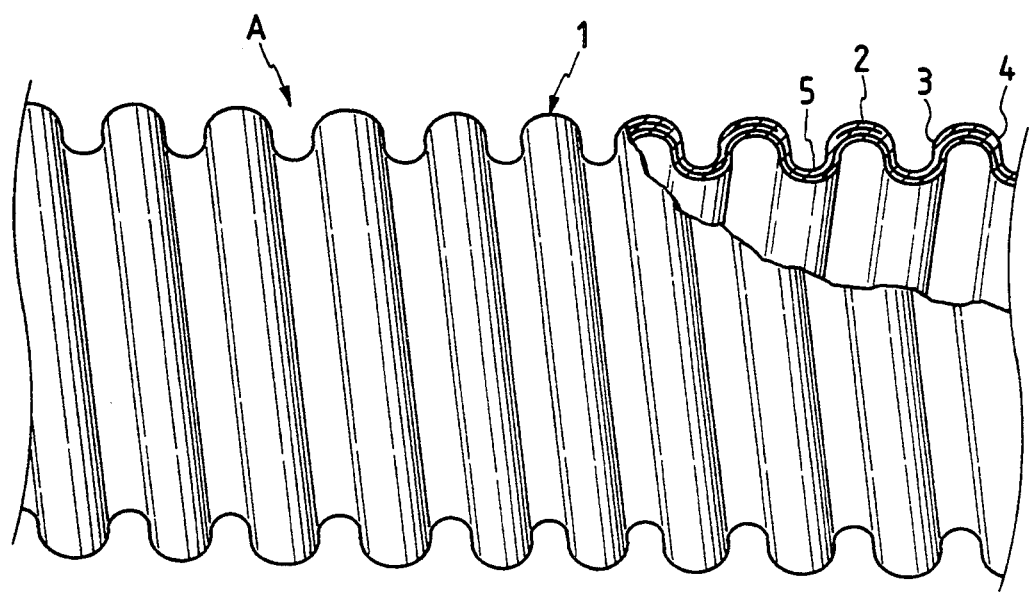
FIGS. 1 and 2 are illustrative of a first embodiment of the present invention.
Figure 2:
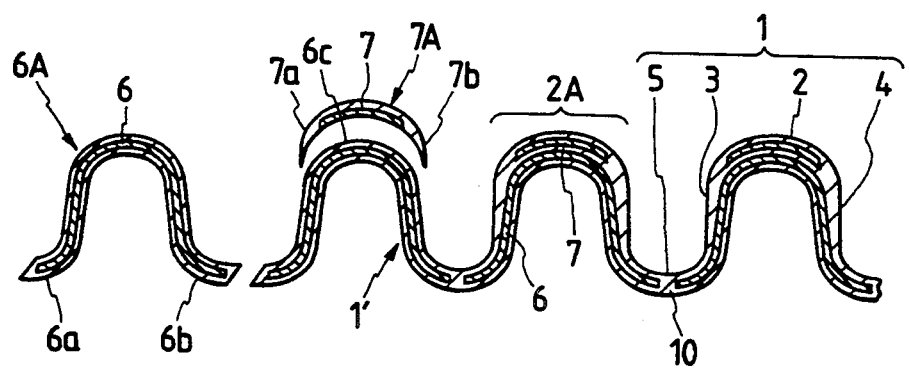

FIGS. 1 and 2 show one preferred embodiment of the invention (hereinafter referred to as "first embodiment"). A helical corrugated pipe A shown in FIG. 1 is a synthetic resin pipe, and has a pipe wall 1 having a corrugated U-shaped cross-section. Metal belt plates are embedded in the synthetic resin material constituting the pipe wall 10.

For forming the pipe A, there is used a steel belt plate 6 of a downwardly-open, deep, inverted U-shape with its lower ends arcuately curved laterally and outwardly, as shown in FIG. 2. The belt plate 6 is passed through a synthetic resin extruder (not shown), so that a synthetic resin material is fused onto the entire inner and outer peripheral surfaces of the belt plate 6 to provide a molded belt member 6A. The belt member 6A is helically wound step by step, with its horizontal opposite end or edge portions 6a and 6b overlapping each other, and the overlapped portions are fused together to provide a continuous provisional pipe wall 1'. Then, a belt member 7A is helically wound on the provisional pipe wall 1' in such a manner that the belt member 7A is held against the outer surface of a top portion 6c of the provisional pipe wall 1'. The belt member 7A is formed by letting a small-width arcuate belt plate 7 of steel (separate from the steel belt plate 6) pass through an extruder as described above to integrally fuse the synthetic resin material onto the upper surface and opposite sides of the belt plate 7. The inner surface of the arcuate belt plate 7 is held against the outer molded resin layer of the top portion of the inverted U-shaped belt member 6A, and the resin portions 7a and 7b of the belt member 7A are integrally fused to the outer molded resin layer of the inverted U-shaped belt member 6A to form an outer resin wall at a top portion 2 of the pipe wall 1. Thus, the metal belt plates 6 and 7 are integrally disposed in the covering resin material of the pipe wall 1, and the two metal belt plates 6 and 7 are integrally connected together at their overlap portion 2 by the synthetic resin material over the entire inner and outer surfaces thereof. In this manner, the helical corrugated pipe construction is provided.

In this embodiment, a resin belt region 10 made solely of the synthetic resin is disposed at a generally central portion of a bottom portion 5 of the pipe wall 1, the metal belt plates 6 and 7 being absent in the resin belt region 10.

Figure 3:
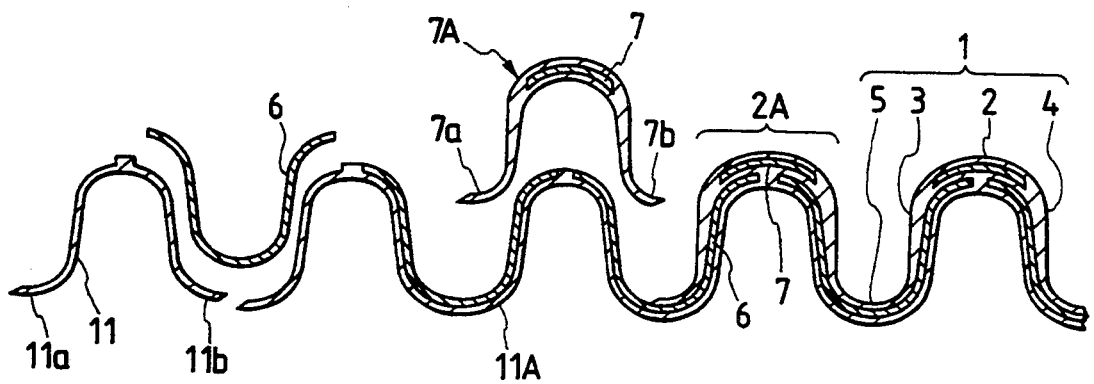
FIGS. 3 to 6 are exploded, longitudinal cross-sectional views of important portions of modified pipes respectively.

FIG. 3 shows another embodiment (hereinafter referred to as "second embodiment") directed to a helical corrugated pipe of a U-shaped corrugated shape as in the first embodiment. There is used a stainless steel belt plate 6 of a generally U-shaped cross-section similar to that of the first embodiment of FIG. 1. A synthetic resin belt member 11 of a downwardly open inverted U-shape having lower end portions 11a and 11b projected laterally and outwardly is helically wound with the opposite end portions 11a and 11b fused together, to form an inner resin layer 11A of the pipe wall 1. The stainless steel belt plate 6 is fitted in the inner resin layer 11A at the bottom portion 5, and is helically wound and bonded to the inner resin layer 11A. A small-width arcuate belt plate 7 of stainless steel similar to that of the first embodiment is molded in a resin material to form a molded belt member 7A of an inverted U-shape having downwardly-extended lower end portions. The molded belt member 7A is helically wound at the top portion 2 with its lower end portions 7a and 7b fused together, and also the molded belt member 7A is fused and integrally joined to the U-shaped belt plate 6, thereby forming the continuous helical corrugated pipe.

In this embodiment, the synthetic resin material is beforehand fused and integrally joined to the entire outer and inner peripheral surfaces of the small-width arcuate metal belt plate 7. Thus, in this helical corrugated pipe construction, the metal belt plate 7 is embedded in the covering material of the synthetic resin. The U-shaped metal belt plate 6 is embedded in the synthetic resin materials of the molded resin belt member 7A and the inner resin belt member 11.

Figure 4:
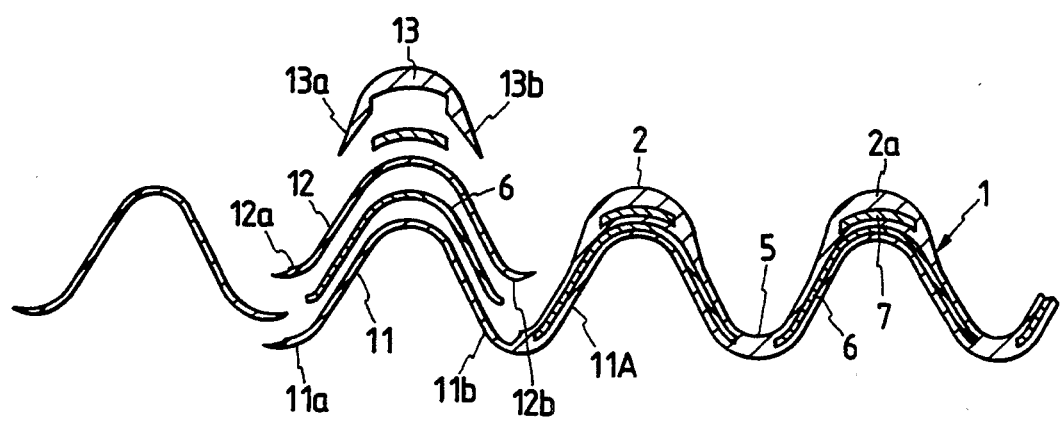

In an embodiment of the invention shown in FIG. 4, there are used synthetic resin belt members 11, 12 and 13 which are formed separately from metal plates 6 and 7. The metal plate 6 is interposed between the belt members 11 and 12, and the metal plate 7 is interposed between the belt members 12 and 13.

In this embodiment, the synthetic resin belt member 11 of a downwardly-open inverted U-shape, which is similar to the belt member 11 of the second embodiment constituting the inner resin layer 11A of the pipe wall 1, is first helically wound with its opposite end or edge portions 11a and 11b fused together. The thin metal belt plate 6 of an inverted U-shape is helically wound on the synthetic resin belt member 11 and is bonded thereto. The second synthetic resin belt member 12 of an inverted U-shape similar to the synthetic resin belt member 11 is wound on the metal belt plate 6, with its opposite end or edge portions 12a and 12b fused together, and also these end portions 12a and 12b are integrally fused to the precedingly-wound inner resin belt member 11 at the central portion of the bottom portion 5 of the pipe wall 1. The small-width arcuate metal belt plate 7, which is greater in thickness than the metal belt plate 6, is wound in such a manner that it is held against the outer surface of the belt member 12 at the top portion 2. Further, the third synthetic resin belt member 13 of an inverted U-shape is wound on the metal belt plate 7 to cover the same. The third belt member 13 is thickened at its central portion, and decreases in thickness progressively from its central portion toward its lower ends 13a and 13b. Thus, the metal belt plate 7 is interposed between the third belt member 13 and the second belt member 12, and the lower end portions 13a and 13b are fused to the second belt member 12, thereby forming the helical corrugated pipe construction having a thickened portion 2a of the synthetic resin at the outer side of the top portion 2 of the pipe wall 1.

Figure 5:
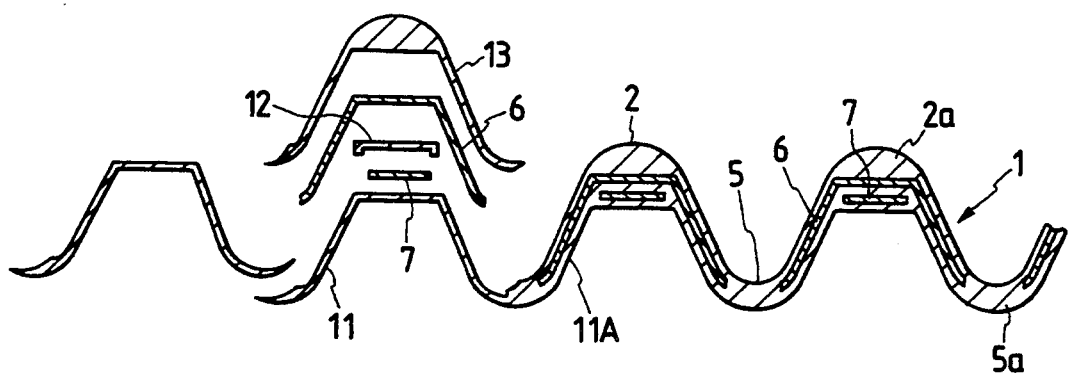

In an embodiment of the invention shown in FIG. 5, synthetic resin belt members 11, 12 and 13 are separate from metal plates 6 and 7 as in the embodiment of FIG. 4. In this helical corrugated pipe construction, the small-width metal belt plate 7 is disposed inwardly of the metal belt plate 6 of an inverted U-shape at the top portion of the pipe wall 1. A thickened portion 2a of a synthetic resin is provided at the outer side of the top portion 2 of the pipe wall 1, and also a thickened portion 5a of a synthetic resin is provided at the inner side of the bottom portion 5.

In the first embodiment, although the belt member to be first wound is the resin molded belt members 6A having the synthetic resin applied integrally over the entire inner and outer peripheral surfaces of the metal belt plate 6, the inner belt member 11, made solely of a synthetic resin, may be first wound to form the inner resin wall layer 11A as in the embodiments of FIGS. 4 and 5, and then the molded belt member 6A may be wound on this inner resin wall layer 11A and be integrally fused thereto. Also, an outer layer or wall of a synthetic resin may be further formed on the outer periphery of the resin molded belt member 7A of the second embodiment (FIG. 3) to cover the same.

The metal belt plates 6 and 7 are not limited to a flat plate, and they can be made by a so-called perforated metal plate having a number of small perforations or punched holes formed therethrough. When synthetic resin layers are applied to such a metal plate having a number of small perforations, the synthetic resin layers on the opposite sides of the perforated metal plate flow through the perforations and are integrally joined together, so that the metal belt plate is firmly joined to the inner and outer resin layers. However, as described above in the above embodiments, the metal belt plates 6 and 7 used in the present invention are not necessarily limited to such a plate having the small perforations.

A method of manufacturing the resin molded belt members 6A and 7A is not limited to the above-mentioned method in which the synthetic resin is extruded from the die together with the metal belt plate 6, 7 to cover the same. For example, there can be used a covering method in which the metal belt plate 6, 7 is dipped in a molten resin, and also other coating and resin-application methods can be used.

In the helical corrugated pipes of the above embodiments, the pipe wall 1 is not provided with an inner pipe wall in the pipe wall 1, and therefore the inner peripheral surface of the pipe has a corrugated configuration. Such a pipe which is a so-called single-wall type helical corrugated pipe is used mainly as a cable protective pipe into which a cable such as an electric cable and a telephone cable is inserted. In this case, the cable, when inserted into the pipe, comes into contact only with the corrugation of the inner peripheral surface of the pipe, and therefore the cable can be inserted into the pipe with a less frictional resistance.

Next, pipes of other embodiments having an inner pipe wall will now be described.

Figure 6:
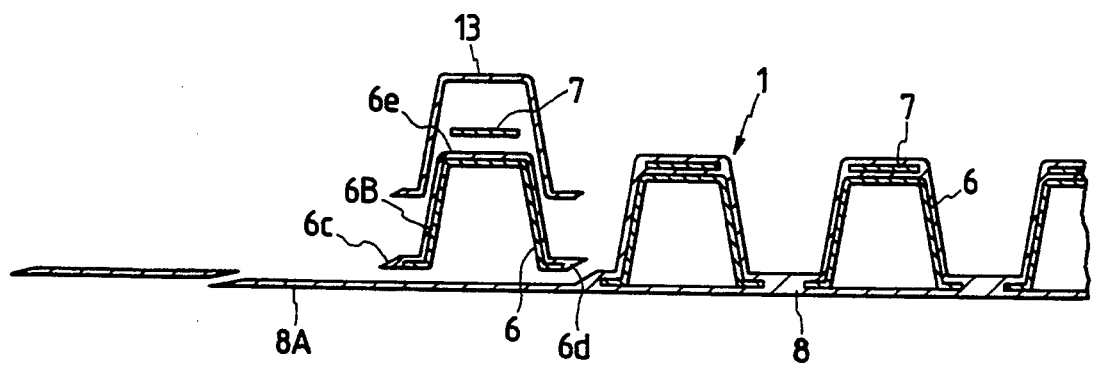

In an embodiment of the invention shown in FIG. 6, a flat belt member 8A of a synthetic resin is first helically wound, with its opposite end or edge portions overlapped each other and fused together, thereby forming a cylindrical inner pipe wall 8. A one-side resin-molded belt member 6B is helically wound on the outer periphery of the helically-wound belt member 8A, and is integrally fused thereto. The one-side resin-molded belt member 6B comprises a metal belt plate 6 of a downwardly-open, inverted trapezoidal shape, and a synthetic resin material integrally fused to the outer peripheral surface of the metal belt plate 6. The belt member 6B has lower end portions 6c and 6d respectively projecting laterally and outwardly from the opposite ends of the metal belt plate 6. These laterally-projecting resin portions 6c and 6d are fused together, and also are integrally fused to the inner pipe wall 8. A small-width flat metal belt plate 7 is helically wound on the belt member 6B in such a manner that the metal belt plate 7 is held against a top portion 6e of the belt member 6B. Further, a synthetic resin belt member 13 of an inverted trapezoidal shape is wound around the metal belt plate 7 so as to cover the one-side resin-molded belt member 6B, thereby forming the outer resin layer which constitutes the outer portion of the pipe. Thus, the helical corrugated pipe wall 1 is formed by interposing the metal belt plate 7 between the belt members 13 and 6B.

Such a pipe having the inner pipe wall 8 provided internally of the helical corrugated pipe wall 1 is mainly used as a water main pipe, a sewer pipe, a pipe for transporting various chemicals or the like in a plant, and a pipe for the air-borne transport of particles such as grain. In this case, because of the provision of the inner pipe wall 8, the flowing fluid in the pipe undergoes a less resistance, and therefore the fluid can be transported smoothly.

The inner pipe wall 8 can be made of a soft resin material, a rigid resin material or a wear-resistant rubber material. The inner pipe wall 8, if necessary, may be reinforced by a reinforcement material such as fibrous material (e.g., threads, fabric and non-woven fabric), a metal plate and a metal net. With this construction, the pipe can withstand a high internal pressure and can be used as a high-pressure transport pipe.

In the above embodiments, the pipes includes the metal belt plates 6 and 7 which are covered with the covering or coating materials of a synthetic resin or the like over the entire inner and outer peripheral surfaces thereof. In other words, the pipes are of such a construction that the two kinds of metal belt plates 6 and 7 are embedded in the pipe wall-forming material of a synthetic resin or the like. However, in the present invention, the two metal belt plates 6 and 7 are not always required to be covered with a synthetic resin or the like over the entire peripheral surfaces thereof. In the case where the metal belt plates 6 and 7 are made of a rust-resistant material or a material which has been subjected to a rust-prevention treatment such for example as plating, electrophoretic deposition, metallic coating and resin baking finish, the pipe can be of such a construction that the metal belt plates 6 and 7 are partially exposed at the surface of the pipe wall, as in those embodiments mentioned below.

Figure 7:
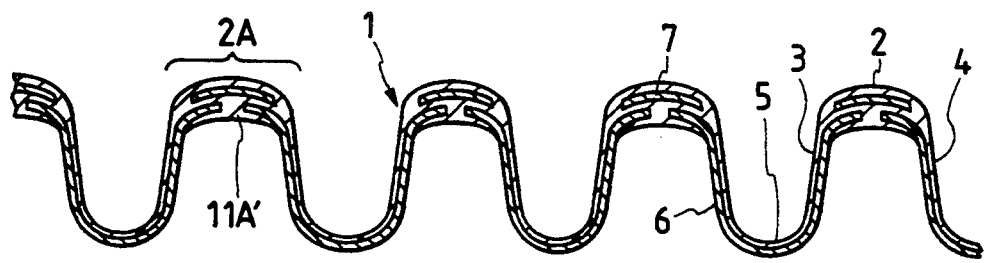
FIGS. 7 to 9 are longitudinal cross-sectional views of important portions of modified pipes.

In an embodiment of the invention shown in FIG. 7, two kinds of metal belt plates 6 and 7 have a generally U-shape and an arcuate shape, respectively, as described above in the second embodiment (FIG. 3). The two metal belt plates 6 and 7 are disposed in overlapping relation to each other at the top portion 2 of the pipe wall 1, this overlap portion being designated at 2A. The inner surface of the pipe wall has a synthetic resin layer 11A' only at the overlap portion 2A where the two metal belt plates 6 and 7 overlap each other, and the entire outer surface is covered by the synthetic resin material. At the inner surfaces of the bottom portion 5 and opposite side wall portions 3 and 4 of the pipe wall 1 except for the top portion 2, the U-shaped metal belt plate 6 is exposed.

Figure 8:
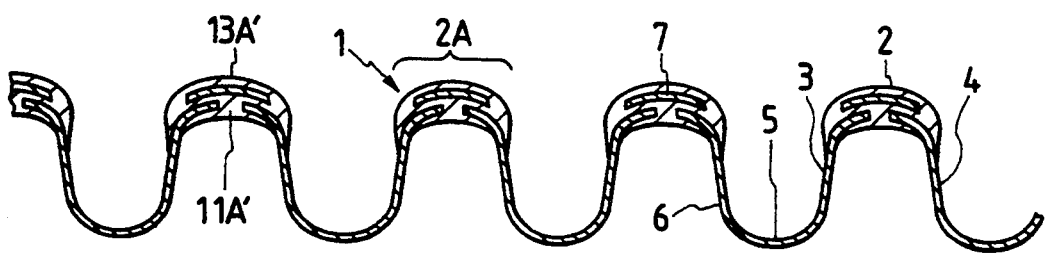

In an embodiment of the invention shown in FIG. 8, two kinds of metal belt plates 6 and 7 are similar in shape to those of the embodiment of FIG. 7. The two metal belt plates 6 and 7 overlap each other at the top portion 2 of the pipe wall 1 to provide an overlap portion 2A. Only the inner and outer sides of the overlap portion 2A are covered respectively by synthetic resin layers 11A' and 13A' thereby integrally connecting the two metal belt plates 6 and 7 together. The opposite surfaces of the bottom portion 5 of the pipe wall 1 as well as the opposite surfaces of the opposite side wall portions 3 and 4 are not covered by the covering resin and hence remain bare.

Figure 9:
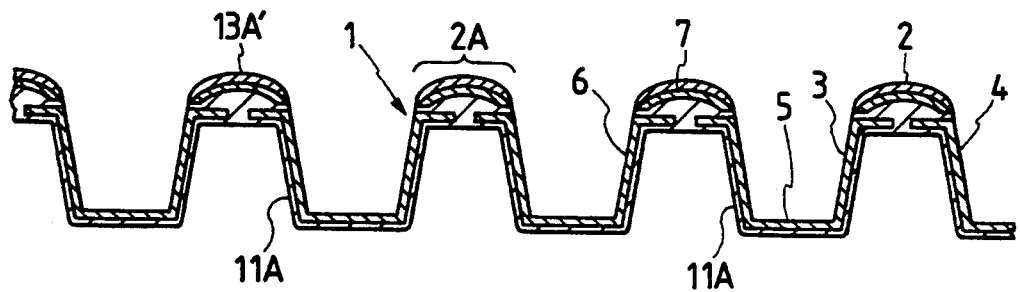
Figure 10:
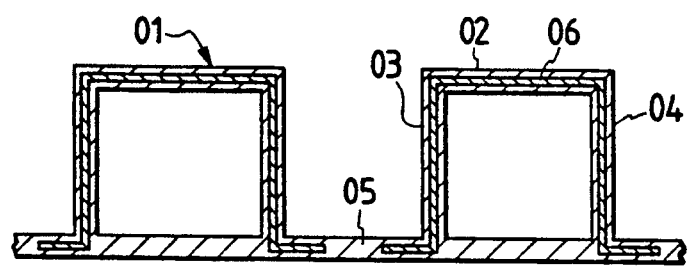
FIGS. 10 and 11 are a longitudinal cross-sectional view and an exploded view of a conventional construction.
Figure 11:
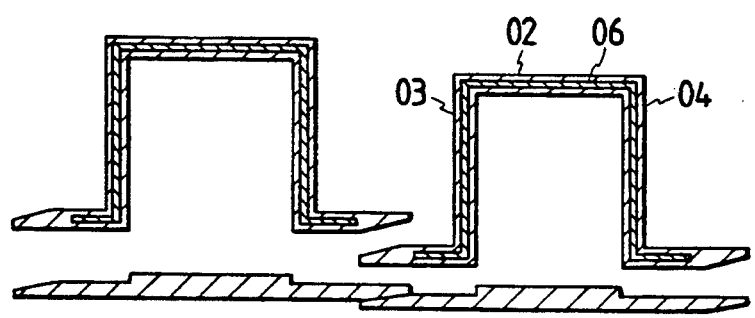

In an embodiment of the invention shown in FIG. 9, an overlap portion 2A where two kinds of metal belt plates 6 and 7 overlap each other is provided at the top portion 2 of the pipe wall 1, as described above. The entire inner surface of the U-shaped metal belt plate 6, as well as the outer surface of the small-width arcuate metal belt plate 7, is covered by a resin material. The two metal belt plates 6 and 7 are connected together at the overlap portion 2A by the inner resin layer 11A and the outer resin layer 13A'. The entire outer surfaces of the bottom portion 5 and opposite side wall portions 3 and 4 except for the outer surface of the top portion 2 of the pipe wall 1 remain bare.

The cross-sectional shape of the pipe wall 1 of the helical corrugated pipes of the present invention may be other than those shown in the above embodiments, and for example, may be of a channel-shaped corrugated cross-section or a triangular corrugated cross-section.

The shapes of the two metal belt plates 6 and 7 are not limited to those shown in the above embodiments, and other shapes can be employed. Also, the two metal belt plates are not required to have the same thickness, and they can have different thicknesses as in the embodiment of FIG. 4, and they can be made of different materials and have different hardnesses, which can be suitably chosen. Further, the thickness of the covering resin material does not always need to be uniform over the entire region thereof. For example, as in the embodiments of FIGS. 4 and 5, the thickened covering resin portions 2a and 5a may be provided respectively at the outer side of the top portion 2 of the pipe wall 1 and at the inner side of the bottom portion 5. In contrast with such embodiments, these thickened portions may not be provided over the entire widths of the top portion 2 and the bottom portion 5, but may be partially provided to form a projection.

In the case where such thickened resin portion is thus provided at the inner side of the bottom portion 5, even when wear develops due to the frictional contact of a cable or the like, the wear does not reach the metal belt plate 6, so that the metal belt plate 6 will not become bare, thus positively preventing this metal belt plate from being subjected to rust. In the case where such thickened resin portion is thus provided at the outer side of the top portion, even when the pipe is dragged at the time of installation thereof, and is brought into contact with a sharp corner of a stone or a rock so that the pipe is damaged, the metal belt plate 6 or the metal belt plate 7, advantageously, will not be exposed immediately.

In the above embodiments, the synthetic resin material is interposed between the two metal belt plates 6 and 7, and the two metal belt plates are not held in contact with each other. However, the two metal belt plates 6 and 7 may be held in contact with each other.

As to the material of the metal belt plates 6 and 7, instead of a thin stainless steel plate or a steel plate, an iron plate may be used. Also, other metal may be used. When forming the above-mentioned perforations (punched holes), the shape, size and density of such perforations can be suitably determined.

As to the synthetic resin materials forming the pipe wall and the connective portions, a polyolefin such as polyethylene, polypropylene or the like, and a vinyl chloride can be mainly used, but other synthetic resins may be used. Also, rubber or a rubber-type resin such as synthetic rubber may be used.

While the representative embodiments of the invention have been described herein, the invention itself is not to be restricted to such embodiments, and suitable modifications can be made so long as they have the essential features of the invention, achieve the object of the invention, and achieves the advantageous effects of the invention mentioned below.

As described above in detail with reference to the preferred embodiments, in the present invention, the wide thin metal belt plate is used as a constituent element for the pipe wall. The metal belt plate is suitably processed and deformed, and the metal belt plate continuously extends at least over the top portion of the helical corrugated shape and the opposite side wall portions extending from the top portion. In such a construction, the metal belt plate of a small width, formed separately of the first-mentioned metal belt plate, is disposed in the top portion of the pipe wall and is disposed in overlapping relation to the first-mentioned metal belt plate in the direction of the thickness of the pipe wall. In this helical corrugated pipe, the two metal belt plates are integrally connected together at this overlap portion by the synthetic resin material or the like. With this construction, the wide metal belt plate cooperates with the small-width metal belt plate to withstand an external pressure. Therefore, the wide metal belt plate can be made of a thin plate which can be easily processed. Even if the wide metal belt plate is made of a considerably thin plate, there can be provided the helical corrugated pipe which has a sufficient pressure-resistant strength to withstand a flattening force. Therefore, even when the wide metal belt plate is covered with the synthetic resin material over the entire inner and outer peripheral surfaces thereof, such covering synthetic resin layers can be considerably reduced in thickness. This achieves such advantages as the reduction of the overall weight of the pipe, easier transport and handling of the pipe, and the reduction of the amount of the synthetic resin to be used. Moreover, as to the manufacture of the pipe, the wide metal belt plate which is rather difficult to be processed and formed into a wound shape can be made of a thin plate as described above, and therefore the pipe body can be easily manufactured. In addition, the top portion of the pipe wall is not subjected to wrinkles, and therefore the pipe having a good appearance can be manufactured. Further, the small-width metal belt plate can be, if necessary, made of a relatively thick plate. Thus, the above advantages can be achieved.

What is claimed is:

1. A pressure-resistant pipe having a helical corrugated outer surface, comprising:
   a continuous helical corrugated pipe wall including a first helically-wound metal belt plate so as to reinforce the pipe;
   a second metal belt plate spaced from and overlapping at least a top portion of said first metal plate in a direction of thickness of said pipe wall so as to reinforce the pipe; and
   a connecting material for integrally connecting said first and second metal belt plates at the overlapping portion, said pipe wall and said connecting material being a synthetic resin material, said first and second metal belt plates being disposed so as to define said corrugated outer surface, said second metal belt plate being embedded in said synthetic resin material, and an outer surface and an inner surface of said first metal belt plate being directly covered by said synthetic resin material.

2. A pressure-resistant helical corrugated pipe according to claim 1, further comprising an inner pipe wall in said pipe wall.

3. A pressure-resistant helical corrugated pipe according to claim 2, wherein said inner pipe wall is made of a material selected from a group consisting of a soft resin material, a hard resin material and a wear-resistant rubber material.

4. A pressure-resistant helical corrugated pipe according to claim 3, wherein said inner pipe wall is reinforced by a reinforcement material selected from a group consisting of a fibrous material, a metal plate and a metal net.

5. A pressure-resistant helical corrugated pipe according to claim 1, wherein said first and second metal belt plates are embedded in said helical corrugated pipe wall.

6. A pressure-resistant helical corrugated pipe according to claim 1, wherein said first and second metal belt plates are made of a material selected from a group consisting of stainless steel, steel and iron.

7. A pressure-resistant helical corrugated pipe according to claim 1, wherein said synthetic resin is made of a material selected from a group consisting of a polyolefin and a vinyl chloride.

8. A pressure-resistant helical corrugated pipe according to claim 1, wherein a thickness of said small width metal plate is thicker than that of said wide metal belt plate.

9. A pressure-resistant helical corrugated pipe according to claim 1, wherein said first and second metal belt plates are spaced from one another.

10. A pressure-resistant pipe having a helical corrugated outer surface, comprising:

a continuous helical corrugated pipe wall including a first helically-wound metal belt plate so as to reinforce the pipe;

a second metal belt plate spaced from and overlapping at least a top portion of said first metal plate in a direction of thickness of said pipe wall so as to reinforce the pipe;

a connecting material for integrally connecting said first and second metal belt plates at the overlapping portion, said pipe wall and said connecting material being a synthetic resin material, said first and second metal belt plates being disposed so as to define said corrugated outer surface, said second metal belt plate being embedded in said synthetic resin material, and at least an outer surface of said first metal belt plate being covered by said synthetic resin material; and a cylindrical inner pipe wall provided internally of said pipe wall, said cylindrical inner pipe wall having an outer surface confronting said first metal belt plate.

* * * * *